Nov. 27, 1923.　　1,475,555
A. E. SARGEANT ET AL
FILING CABINET
Filed April 15, 1920
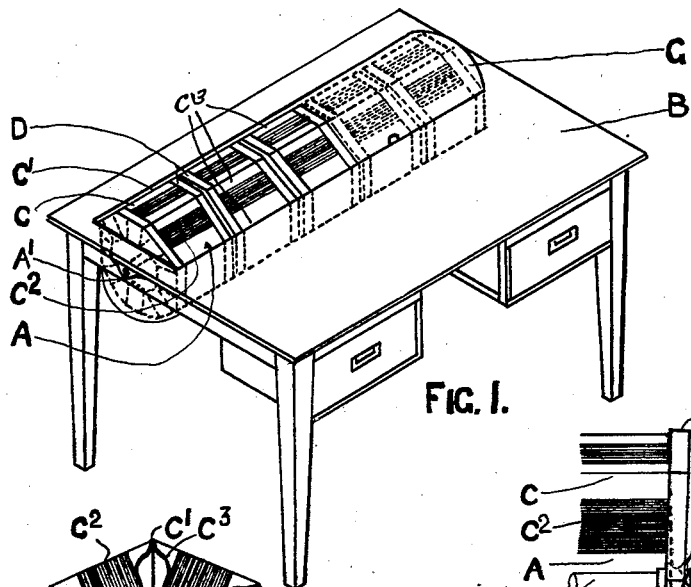
FIG. 1.
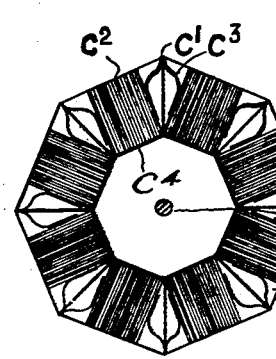
FIG. 3.
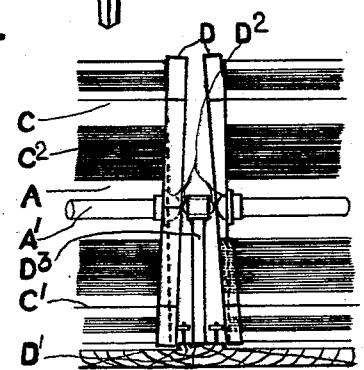
FIG. 2.
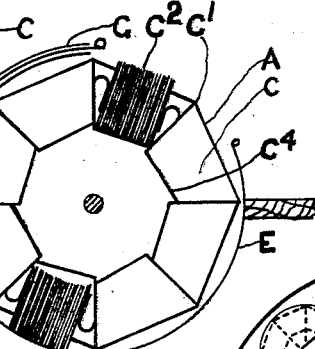
FIG. 4.
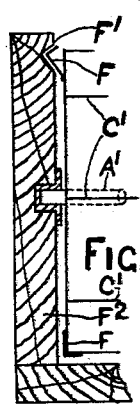
FIG. 5.
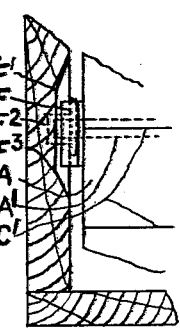
FIG. 6.
FIG. 7.
Inventors
A. E. Sargeant and S. A. Moody
By H. P. Kerslake
Attorney Patented Nov. 27, 1923.

1,475,555

UNITED STATES PATENT OFFICE.

ALFRED EUSDEN SARGEANT AND SYDNEY ARTHUR MOODY, OF BRISBANE, AUSTRALIA.

FILING CABINET.

Application filed April 15, 1920. Serial No. 374,180.

*To all whom it may concern:*

Be it known that we, ALFRED EUSDEN SARGEANT and SYDNEY ARTHUR MOODY, subjects of the King of Great Britain, residing at Brisbane, in the State of Queensland, Commonwealth of Australia, have invented certain new and useful Improvements in Filing Cabinets, of which the following is a specification.

We have invented means whereby a very large number of records can be kept that are immediately to the hand of an operator seated at his desk.

Our invention consists of a drum preferably octagonal and divided into compartments to hold an equal predetermined number of cards. Means are provided by which the cards are held in the respective compartments until such time as it is desired to remove them. The partitions forming the compartments are made with a portion nearest the centre curved to help hold the cards in, and this curved portion may be a spring or have a spring behind it; the rest of the partition may be straight.

Sliding telescopic means may be provided to hold the cards in when, as the drum is revolved, the cards reach a point where they are inclined to fall out, or a fixed guard may be provided for the top edge of the cards at their ends to rest on during the period of their inversion as the drum revolves, or a hinged flange at the end of each compartment may be provided to hold the cards in and may be opened by hand and closed automatically when the drum starts revolving.

A single drum may be used if the number of cards is small, or a number of drums arranged in a desk to revolve on a horizontal axis, or a number of drums may be carried on horizontal axes on a revolvable frame also carried on a horizontal axis.

The drums may be made of any suitable material, although we think sheet metal is preferable, while the drum may have ball bearings or run on roller bearings with a fixed shaft.

These drums may also be fitted with the revolvable frame into a desk, and be so arranged that only the top of the periphery of one drum is opposite the opening in the desk for the attendant to see the cards and operate as desired with any one card; or the drums may be in one line on a common axis with the top compartment only corresponding with the opening in the desk.

Means would be provided on each drum for an index marker or reference as may be required.

In order that our invention may be better understood we will now describe same with the aid of the accompanying drawings, in which—

Fig. 1 is a perspective view of a table fitted with one form of our invention.

Fig. 2 is a detail thereof showing means for holding the cards while inverted.

Fig. 3 is a detail view showing an alternative arrangement for holding the cards.

Fig. 4 is a detail view showing another alternative.

Fig 5 is a detail view showing a further alternative, and

Fig. 6 is a plan of same.

Fig. 7 is a side sectional view of a table fitted with another form of our invention.

In carrying out our invention we provide a single drum A or a series of drums A arranged on an axle $A^1$ carried on a suitable frame or in a box or on a table B, or a number of drums A carried on axles $A^1$ carried in turn by a revolvable skeleton frame $B^1$ (Fig. 7) supported on an axle $B^2$. These drums A may be round or polygonal; we find that octagonal drums are best.

They are divided into a number of compartments C by partitions $C^1$, each compartment C being arranged to hold an equal predetermined number of cards $C^2$. The partitions $C^1$ may be curved towards the centre, thus forming parallel sides to the compartments C. These curved portions may be solid with the partitions $C^1$, they may be springs $C^3$ (Fig. 3) secured to the partitions $C^1$, or they may have springs interposed between them and the partitions $C^1$. The bottoms $C^4$ of each compartment C may be flat as shown in Fig. 3 or sloped as shown in Fig. 4. With the latter arrangement the cards $C^2$ are stepped downward from the front to the back, thus facilitating their manipulation.

Means are provided by which the cards $C^2$ are held in, and prevented from falling from their respective compartments when inverted. In the drawings we show several methods of attaining this end. That which we prefer is shown in Figs. 1 and 2, wherein we provide a flanged disc D carried loosely on the axle $A^1$, at each end of the drum A. These flanged discs D, which fit over the ends of the drums A are actuated by small rollers $D^1$ so that they are caused to engage the ends of the cards $C^2$ while they are inverted, leaving them free to be removed from the uppermost compartments. The centres of the flanged discs D are prevented from moving lengthwise on the axle A by the collars $D^2$, shoulders or pins or other device on or in the axle $A^1$. When a number of drums A are arranged side by side on a common axle $A^1$ the collars $D^2$ between the adjacent flanged discs D are carried by the supports $D^3$. It is advisable to arrange the flanged disc D to rotate with the drum A and thus prevent unnecessary wear and tear.

In Fig. 3 the cards $C^2$ are held by springs $C^3$ secured to the partitions $C^1$. In this case it is sometimes, perhaps, advisable to have additional means for holding the cards $C^2$ in place; these may be as in Figs. 1 and 2 or 4. In the latter case we provide a cover plate E. As a further alternative the ends of each compartment C may be provided with a hinged flange F, (Fig. 5) normally arranged to engage the ends of the cards $C^2$ but capable of being moved over into the recess $F^1$ in the partitions $F^2$ between the drums A. This recess is provided with inclined sides $F^3$ to ensure the hinged flanges F being moved to their normal position.

A number of the drums A and attendant parts, as hereinbefore described, may be carried by a skeleton frame $B^1$ rotatably carried by a table B, on a frame or in a box, suitable means being provided for holding the cards $D^2$ in the compartments.

To prevent improper manipulation and to prevent the dust getting into the files a cover G (Figs. 1 and 7) is provided; the cover G may be in sections, one for each drum A.

The details of construction may be varied as found necessary when placing our invention on the market, and, if desired, ball or other suitable bearings may be provided for the drums A. Index markers or references are provided in suitable positions on the drums A. The drums A may be carried on a vertical axis.

We do not confine ourselves to a given number of compartments, which should, however, be made to hold exactly the same number of cards; thus a drum might be made to hold 300 cards in each compartment and have eight such; the drum would then hold 2,400 cards. Place eight of these on a revolvable frame and you have 19,200 cards, all of which are accessible at a minute's notice without the operator moving out of his chair.

From the foregoing the operation of our invention will be readily understood. There is no alteration in the system in vogue in filing cards, but instead of being filed in drawers as hitherto they are filed in the various compartments C in the drum A.

Having now particularly described and ascertained the nature of our said invention and in what manner the same is to be performed we declare that what we claim is:—

1. A filing cabinet comprising a supporting member, a rotatable drum carried by said suporting member and provided with a circumferentially arranged series of peripherally opening pockets, and rockably mounted members designed to project over the open ends of the pockets for holding cards or the like within said pockets when the pockets are in inverted position.

2. In improved means for holding record cards, a drum rotatably carried on an axle, compartments formed in said drum, a flanged disc adapted to fit over each end of said drum and said cards, and means for canting said flanged disc.

3. A filing cabinet comprising a supporting member, a rotatable drum carried by said supporting member and having a circumferentially arranged series of peripherally opening pockets, resilient members arranged on the front and rear walls of each of said pockets for retaining cards and the like within the pockets, and movable members designed to project over the open ends of the pockets for holding cards or the like within said pockets when the pockets are in inverted position.

4. An improved means for holding record cards including an axle, a drum rotatably mounted on said axle, circumferentially arranged pockets formed in said drum, rockable flanges arranged at the ends of the pockets, and means for moving said flanges towards the pockets whereby said flanges will extend over a portion of the pockets when said pockets are in inverted position.

Dated at Brisbane this twenty-ninth day of February, A. D. 1920.

ALFRED EUSDEN SARGEANT.
SYDNEY ARTHUR MOODY.

Witnesses:
ALEXANDER ANDERSON,
MABEL C. LOW.